E. F. Gardner
Survivor of Community Estate
C. W. Gardner dec'd.
Inventor.

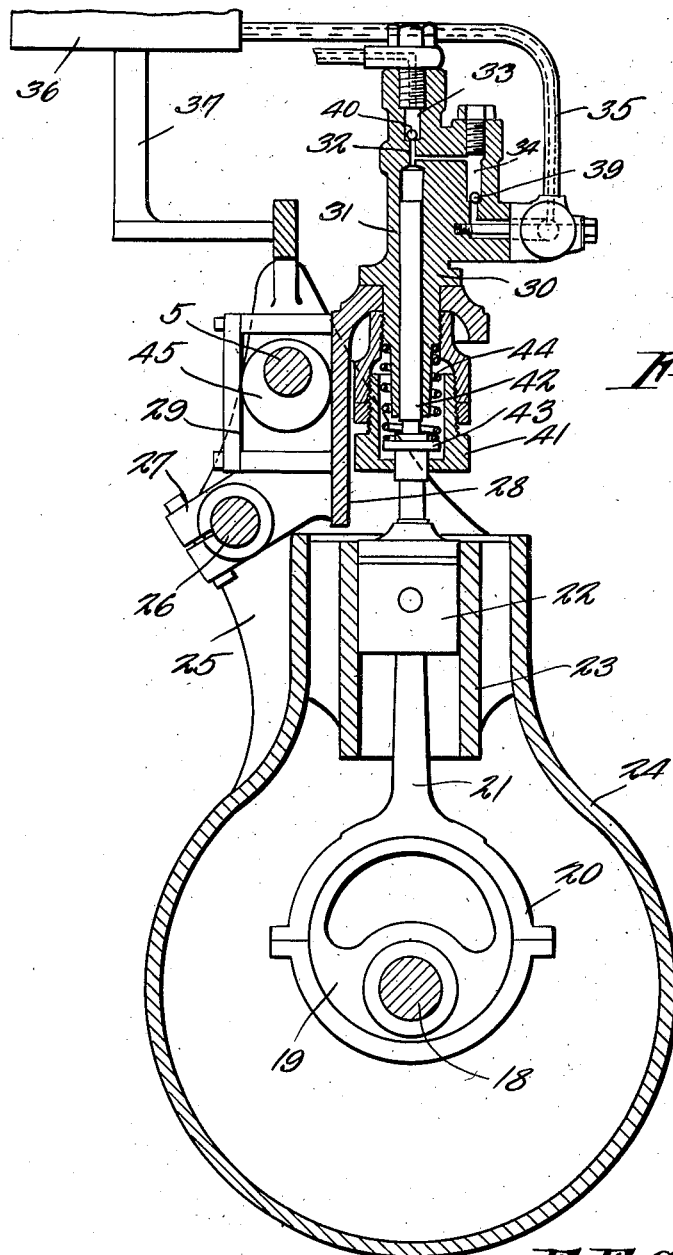

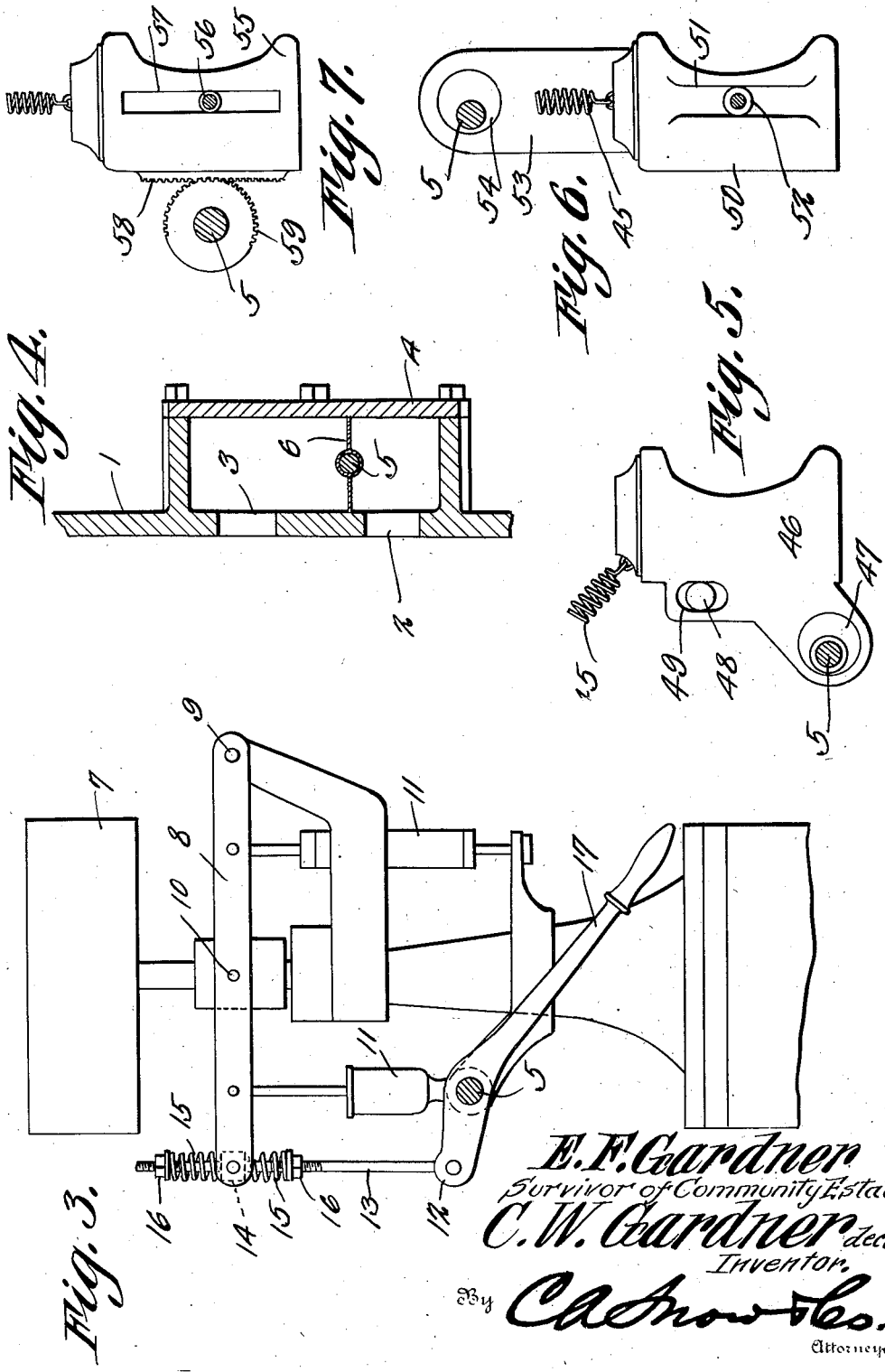

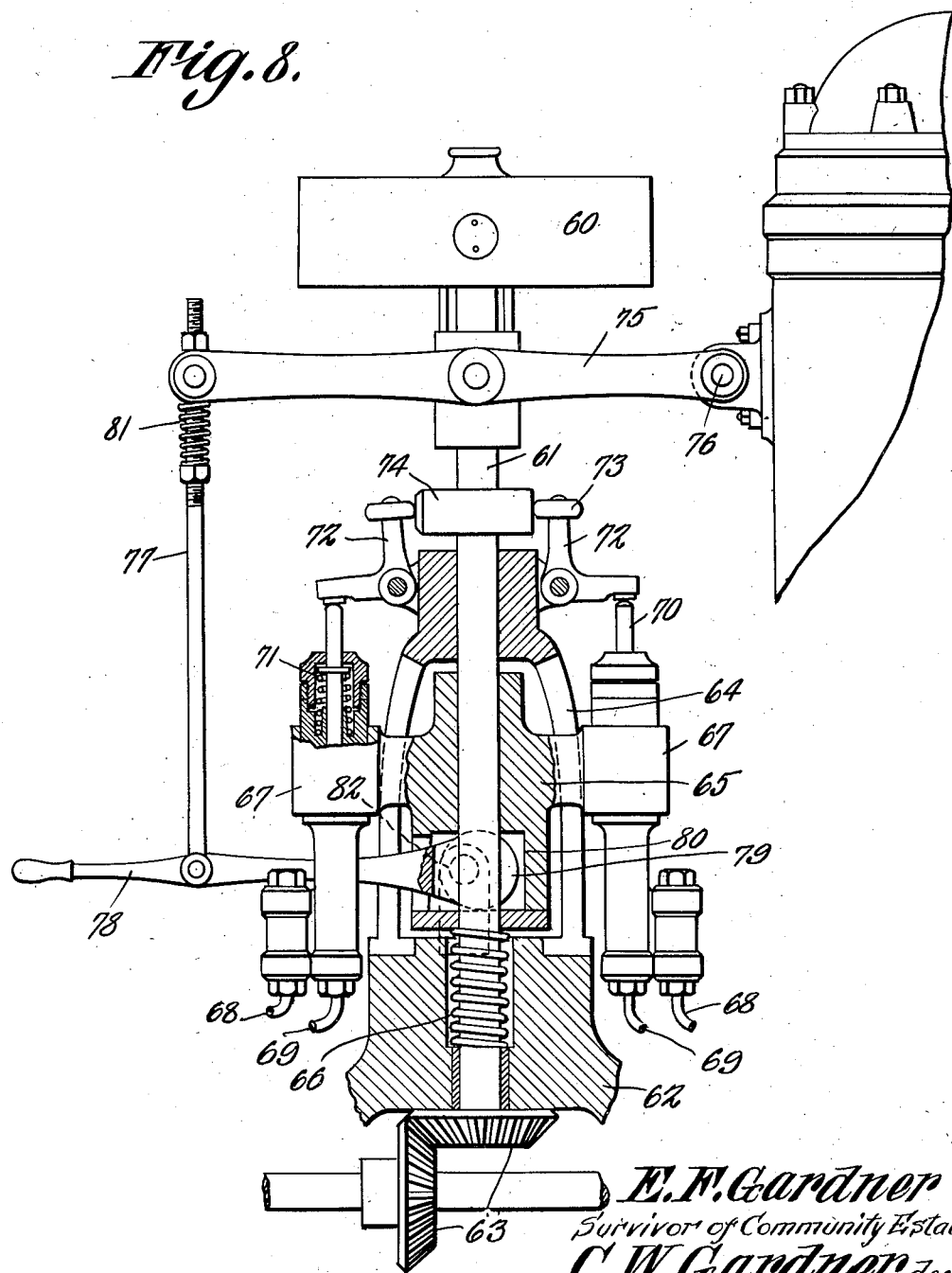

July 28, 1925.
C. W. GARDNER
1,547,579
FUEL AND AIR CONTROL FOR INTERNAL COMBUSTION ENGINES
Filed April 17, 1922
6 Sheets-Sheet 5
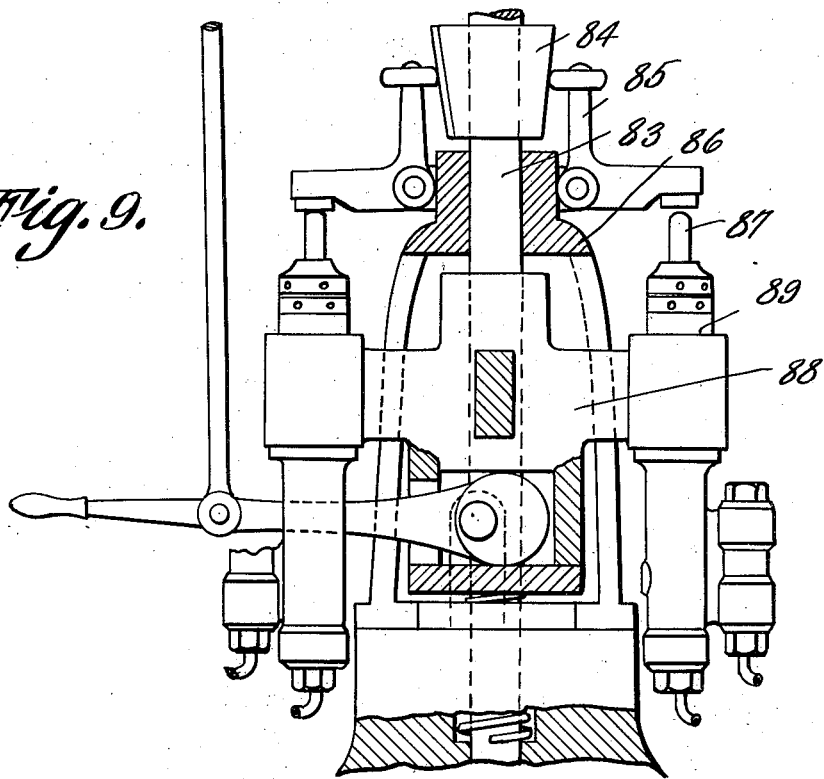
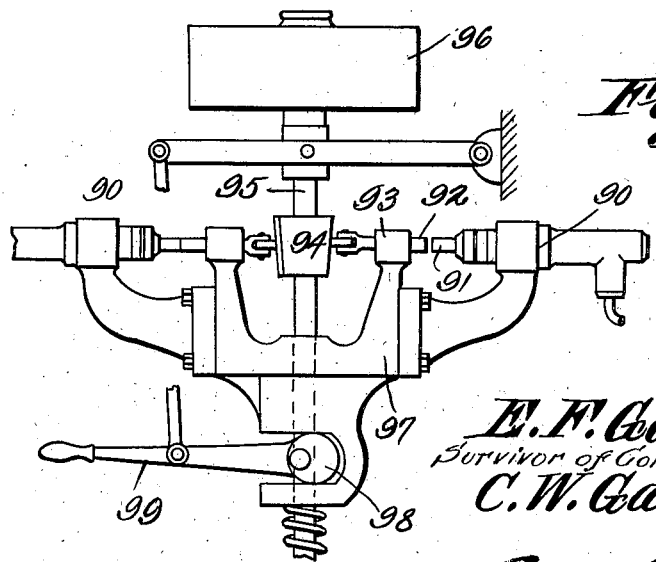

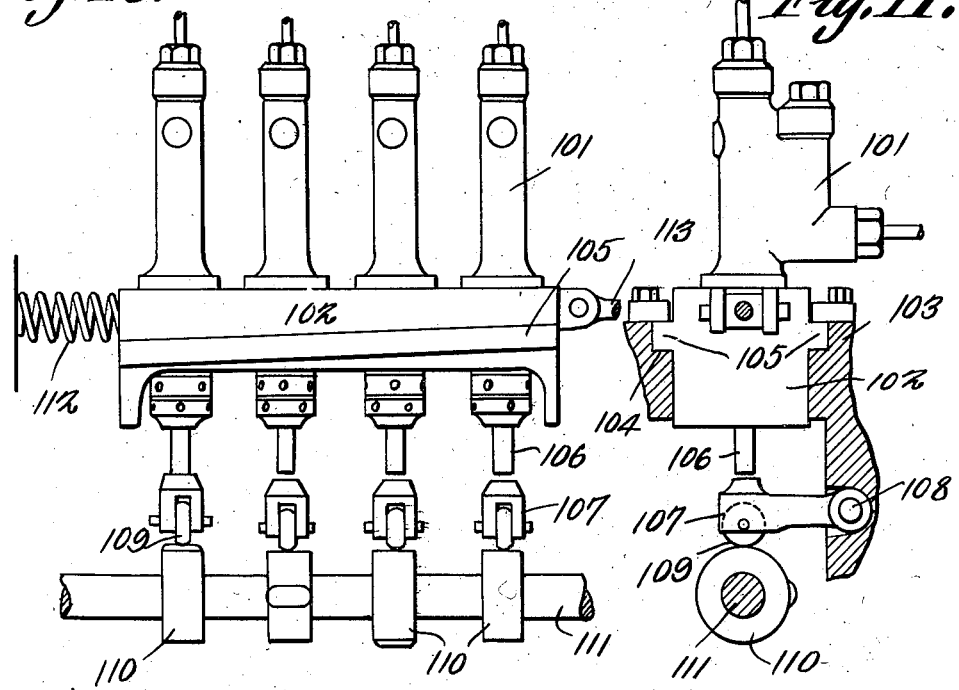
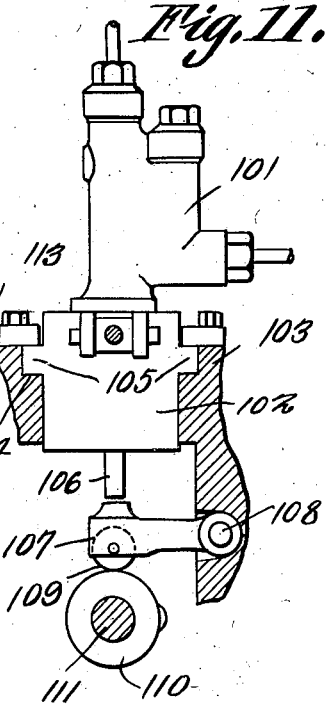
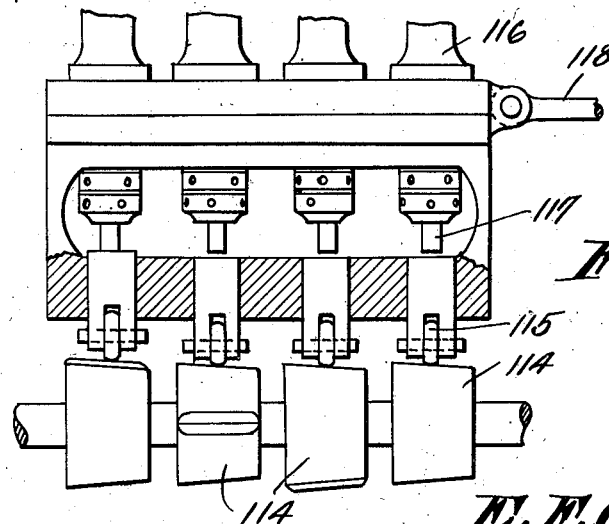

bustion Engines, of which the following is a specification.

This invention relates to a fuel and air control for internal combustion engines, one of its objects being to provide an effective and efficient means for feeding fuel to the engine cylinder or cylinders, said means being under either or both governor and hand control.

A further object is to provide a feed or ejecting pump for the fuel which is shiftable bodily relative to its actuating means, thereby to control accurately the flow of fuel to the cylinder or cylinders of the engine.

Another object is to provide a feeding means which so regulates the flow of fuel as to prevent discharge of excess fuel into the engine.

Another object is to provide manually operated means for controlling the feed, said means being shiftable without placing the controlling governor under undesirable strains.

Another object is to provide a feeding means which can be instantly disengaged from its actuating means without producing heavy detonations, when it is desired to stop the engine, said feeding means being also shiftable instantly into operative relation with the engine as during the operation of stopping and reversing the engine.

A further object is to combine with the fuel feeding means a means under the control of a governor or a hand operated element for regulating the flow of air to the engine.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

ent improvements combined therewith.

Figure 2 is an enlarged section on the line 2—2, Figure 1.

Figure 3 is an enlarged section on line 3—3, Figure 1.

Figure 4 is an enlarged section on line 4—4, Figure 1.

Figure 5 is an elevation showing a modified mounting of the pump casing of the feed mechanism.

Figure 6 is a similar view showing another modified arrangement.

Figure 7 is a view showing a further modification of the mounting of the pump casing.

Figure 8 is a view partly in section and partly in elevation showing another form of fuel feed control.

Figure 9 is a view partly in section and partly in elevation of a modification of the structure shown in Figure 8.

Figure 10 is an elevation of another form of feed control.

Figure 11 is an end elevation thereof, adjacent parts being shown in section.

Figure 12 is a view similar to Figure 10 showing another form of feed control.

Figure 13 is an elevation of another modification of the feed control.

Figure 1:
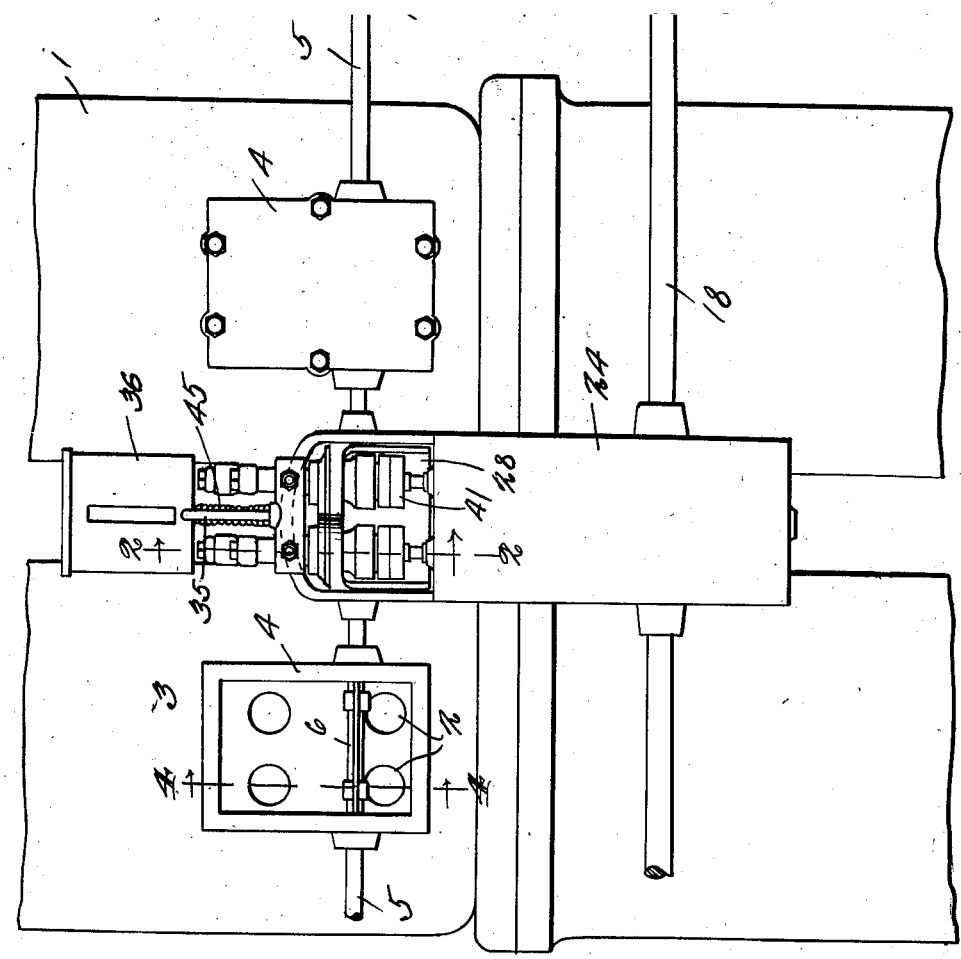

Referring to the figures by characters of reference 1 designates the cylinders of an internal combustion engine, each being provided with air ports 2 leading from the crank case of the engine and with ports 3 leading to the cylinder, all of these ports opening into a casing 4 through which extends a governor lay shaft 5. A damper or valve 6 is secured to the shaft within each of the casings 4 so that by rotating shaft 5 the damper will be tilted to regulate the flow of air from the ports 2 to the ports 3.

A governor of any well known type has been indicated generally at 7, and a yoke 8 is pivotally mounted in the usual manner at 9 and is operatively connected to the governor as at 10, this yoke being provided with the usual dash-pot or other controlling means 11 for restricting the movement thereof.

The shaft 5 has an arm 12 extending therefrom and a link 13 is pivotally connected to this arm and slides within a guide nut 14 or the like carried by the yoke. Coiled springs bear against opposed faces of this nut and are mounted on the link or rod 13, these springs being shown at 15. Any suitable means, such as nuts 16 are mounted on the link for varying the compression of the springs. A hand lever 17 is extended from the shaft 5 and by shifting this hand lever the rod or link 13 will pull or push through one of the springs 15 upon or against yoke 8 so as to shift it independently of the action of the governor. These springs constitute means for shifting this manual action so that the parts of the governor will not be subjected to abrupt and injurious strains or pressures.

Different kinds of fuel injecting apparatus are adapted to be combined with the governor controlled shaft and dampers or valves hereinbefore described. For example, and as shown particularly in Figure 2 a shaft 18 driven by the engine may be provided with an eccentric 19 for each of the cylinders of the engine. Mounted on each eccentric is a strap 20 from which extends an arm 21 having a piston-like tappet 22 pivotally mounted thereon and working within a cylinder 23. This cylinder is formed in or secured to a housing 24 which is fixed relative to the engine and has an extension 25. A pivot pin 26 is supported by the extension and mounted thereon is an ear 27 extending from a frame 28 having an opening 29 therein. Supported by the frame 28 is a pump casing 30 having a bore 31 extending thereinto from one end, this bore being provided at its other end with a port 32 in communication with a fuel outlet 33 and a fuel inlet 34. The inlet 34 is in communication with a pipe or tube 35 leading from an auxiliary fuel reservoir 36 which can be supported by a bracket 37 from the frame 28. Any suitable means such as a check valve 39 is employed for preventing the flow of pressure from the bore 31 to the tube 35 and another check valve 40 or the like is provided for preventing the return of fuel from the outlet 33 to the bore 31.

An adjusting cap 41 is connected to one end portion of the casing 30 and slidable within this cap and within the bore 31 is a plunger 42 having an annular collar within the cap 41 as shown at 43. This collar constitutes an abutment for one end of a coiled spring 44 housed in the cap 41 and bearing against the casing 30. The outer end of the plunger 42 projects beyond the cap 41 and bears against the tappet 22. Spring 44 serves to hold the plunger normally in contact with the tappet but the longitudinal movement of the plunger under the action of the spring is limited by the collar 43 coming against the cap 41. Obviously by adjusing this cap the movement of the plunger 42 under the action of the spring can be controlled.

The shaft 5 extends through the opening 29 in the frame 28 and has a cam 45 working within said opening. Thus it will be seen that when the shaft is rotated the cam 45 will operate to swing the pump casing 30 and the parts connected thereto about the pivotal connection 26 with the result that the plunger 42 will either be pressed more firmly against the tappet 22 due to the placing of the spring 44 under increased compression, or the compression of the spring will be reduced and the pressure of the plunger against the tappet lessened or said plunger bodily removed from the tappet.

During the operation of the engine it will be understood that the tappet 22 is reciprocated continuously and with the parts set under normal running conditions this tappet will push against plunger 42 to inject fuel into the engine and said plunger will be returned after each feeding stroke by the spring 44, this spring holding the plunger constantly in contact with the tappet. The rotation of the shaft 5 either by the governor or through the manual actuation of the lever 17 will result in the tilting of the casing 30 in one direction or the other. If the casing 30 is tilted to the left in Figure 2 the spring 44 will move the plunger 42 downwardly with the result that said plunger will be only momentarily engaged by the tappet during the reciprocation thereof and, consequently, the amount of fuel fed to the engine will be reduced. By tilting the casing 30 to the right in Figure 2 the plunger 42 will be caused to follow the tappet 22 farther downwardly into the cylinder 23 and, therefore, said plunger 42 will be given a longer stroke during each upward movement of the tappet and more fuel will be fed into the engine than would otherwise be supplied thereto. As the rotation of shaft 5 producing these adjustments of the casing 30 also rotates the damper or valve 6 it will be obvious that the air supplied to the engine will be regulated at the same time as the regulation of the fuel takes place, thus insuring a proper mixture.

For the purpose of relieving the cam 45 of considerable of the weight of the pump casing 30, it is preferred to connect the casing 30 to some stationary part of the engine by means of a spring 45' or the like.

Although the pump casing 30 has been shown mounted in the particular way disclosed in Figures 1 and 2 it is to be understood that other ways of mounting this casing can be used. For example, and as shown in Figure 5, the pump casing 46 can be mounted on a cam 47 carried by the governor lay shaft 5 and a guide and supporting pin 48 can be extended through a slot 49 in the casing. Rotation of the cam 47 will obviously produce a rocking movement of the casing 46 sufficient to secure the necessary change of position of said casing relative to the tappet heretofore described.

Another modification has been illustrated in Figure 6 wherein the pump casing 50 is provided with a longitudinal guide 51 into which extends a guide roller 52. An ear 53 is extended from the pump casing and has a cam 54 mounted for rotation therein, this cam being rotatable with the governor lay shaft 5.

Under some conditions a structure such as shown in Figure 7 might be desirable. In this structure the pump casing 55 has a longitudinal groove into which extends a guide roller 56 or the like, the groove being indicated at 57. A rack 58 is extended longitudinally of the pump casing and is engaged by a segmental gear 59. This gear rotates with the shaft 5 so that during the actuation of said shaft the casing 55 will be shifted longitudinally in one direction or the other relative to its guide roller 56.

In Figure 8 there has been shown a structure in which the governor and the pump mechanism are more closely associated than in the other forms heretofore described. In this figure the governor 60 has its shaft 61 extending through a supporting structure 62 and provided with the usual drive gears 63. The structure 62 has slots 64 in which a cross head 65 is slidably mounted, this cross head being also slidable on the shaft 61 which is rotatable therein. A spring 66 seated in the structure 62 bears upwardly against the cross head 65 so as to hold it normally raised. Carried by the cross head are pump casings 67 each having a fuel inlet 68 and a fuel outlet 69. A plunger 70 is slidably mounted within each of the pump casings 67 and each plunger has a spring 71 for yieldingly supporting it normally in raised position. Bell cranks 72 are fulcrumed on the upper portion of the structure 62 and one arm of each bell crank bears against one of the plungers 70 while the other arm of each bell crank carries an antifriction roller 73. These rollers bear against diametrically opposed portions of a cam 74 mounted on and rotating with the shaft 61. Thus it will be seen that during the rotation of the governor shaft 61 the bell cranks 72 will be successively actuated so as to shift the plunger 70 and force fuel through the outlets 69 and to the engine cylinders.

A yoke or frame 75 corresponding with the one heretofore shown at 8, is pivotally mounted as at 76 and is connected to the governor so as to be shifted thereby. This frame or yoke has a rod 77 slidably and pivotally connected thereto and also pivotally connected to a hand lever 78 fulcrumed in the structure 62. This hand lever has a cam 79 at its pivot end, the said cam being positioned within an opening or recess 80 formed within the cross head 65. A spring 81 is mounted on the rod or link 77 for receiving the pressure from the frame or yoke 75 and thus cushioning the action during the operation of the mechanism.

With this modified construction it will be apparent that should the speed of the engine become excessive the governor through the frame or yoke 75, link or rod 77 and lever 78 would rotate the cam 79 so as to shift the cross head 65 downwardly within the slot 64, thus moving the plungers 70 away from the bell cranks 72 and reducing the scopes of the plungers 70. Should it be desired to accelerate the supply of fuel to the engine the foregoing movement can be reversed manually by means of lever 78 or the governor 60 will do it automatically, cam 79 raising the cross head 65 so as to shift the plungers 70 into closer engagement with the bell cranks 72, thereby increasing the strokes of the plungers when the bell cranks are actuated. With this construction the bearing of the cam 79 and lever 78 constitutes a shaft, as indicated at 82, this shaft being rotatable with the cam and being connected to the air valve or damper illustrated at 6 in Figures 1 and 4.

A modification of the structure shown in Figure 8 has been illustrated in Figure 9. In this form of device the governor shaft 83 has been shown provided with a frusto-conical cam 84 and, therefore, when the shaft 83 is shifted longitudinally the frusto-conical cam 84 will be moved therewith and will shift the bell cranks 85 greater or lesser distances, according to the elevation of the cam relative to the structure 86. Thus a variation in the scope of the plungers 87 is obtained in addition to the variation due to the shifting of the cross head 88 on which the pump casings 89 are mounted. The cross head is adapted to be shifted in the same manner as described in Figure 8.

Instead of having the pump casings in parallel relation they can be placed in alignment as shown at 90 in Figure 13, the plungers 91 in this instance being in line with tappets 92 mounted in guides 93, these tappets being disposed at opposite sides of a frusto-conical cam 94 rotating with the shaft 95 of the governor 96. In this arrangement the tappets as well as the pump casings are supported by a cross head 97 shiftable along the shaft 95 by means of a cam 98 which can be operated by a hand lever 99 or by governor operated mechanism indicated generally at 100. Obviously by the up and down movement of the cross head 97 the tappets 92 can be brought into operative relation with different portions of the cam 94 which, by reason of its tapered construction, will shift the tappets distances varying according to the location of the tappets on the cam.

Instead of utilizing a pump casing shiftable by means of rotatable cams as in the structures heretofore described, the various pump casings, as indicated at 101 in Figure 10 and Figure 11 can be mounted on a slidable block 102 mounted in an inclined guideway 103. The guideway can be provided with inclined grooves 104 in which inclined ribs 105 are adapted to slide, these ribs extending from the block 102. Thus when the block is shifted longitudinally the plungers 106 projecting from the casing 101 will be raised or lowered relative to tappet levers 107 pivotally mounted on a supporting structure as shown at 108. Each of these tappet levers has an anti-friction roller 109 bearing on a cam roller 110. Thus when these cam rollers rotate with the shaft 111 the tappets will be elevated thereby and will come against the plungers 106 so as to shift them longitudinally, the amount of movement depending upon the elevation of the pump casings 101 due to the position of the block 102. In this form of device the slidable block 102 can be shifted in one direction by a spring 112 and the governor can be caused to shift the block through a rod 113 connected to the governor in any manner desired.

A further modification has been illustrated in Figure 12 wherein a series of tapered rotatable cams 114 is used, one cam being provided for each tappet 115. These tappets as well as the pump casings 116 and their plungers 117 are adapted to be shifted bodily by the governor or any other suitable means through a rod 118. Obviously by shifting this structure bodily the tappets can be brought into contact with the operating cams 114 at different points on their peripheries, thus to vary the actuation of the plungers by the cams and tappets.

It is to be understood of course that various other forms of apparatus can be used all of them having for their purpose the provision of means under the control of a governor or manually operated means for shifting the pump casings relative to their operating means thereby to vary the amount of fuel ejected by the pump into the engine cylinders. By providing mechanism such as described for controlling the discharge of fuel into the cylinders there is no danger of delivering more than the necessary amount of fuel. Furthermore the supply of fuel can be abruptly stopped and started simply by shifting the pump plungers abruptly out of or into operative relation with their tappets or other operating means.

What is claimed is:—

1. In a feed control for internal combustion engines a tappet, engine driven means for operating the tappet, a fuel pump including a casing in communication with the engine cylinder and a plunger having limited movement in the casing, said plunger being shiftable by the tappet, and means for bodily shifting the pump to move its plunger into or out of contact with the tappet for varying the stroke of the plunger by the tappet.

2. Fuel feed controlling means for internal combustion engines including an engine driven operating element, a fuel ejecting pump including a casing and a plunger having limited movement in the casing, means for holding the plunger normally in operative relation with the operating means, and means for bodily shifting the pump to move the plunger into or out of contact with the operatng means thereby to vary the stroke of the plunger.

3. Fuel feed controlling means for internal combustion engines including an engine driven operating element, a fuel ejecting pump including a casing and a plunger having limited movement in the casing, means for holding the plunger normally in operative relation with the operating means, and governor operating means for bodily shifting the pump relative to the operating means to move the plunger into or out of contact with said operating means thereby to vary the stroke of the plunger under the action of the operating means.

4. Fuel controlling means for internal combustion engines including an engine driven cam, a fuel ejecting pump including a casing and a plunger having limited movement in the casing, means operated by the cam for actuating the plunger, and means for bodily shifting the pump to move the plunger into or out of contact with the operating means thereby to vary the stroke of the plunger.

5. Fuel controlling means for internal combustion engines including an engine driven cam, a fuel ejecting pump including a casing and a plunger having limited movement in the casing, means operated by the cam for actuating the plunger, and means for bodily shifting the pump to move the plunger into or out of contact with the operating means thereby to vary the stroke of the plunger, said means comprising a cam in engagement with the pump, and governor operated means for setting up a relative movement between the pump and the cam.

6. Fuel controlling means for internal combustion engines including an engine driven cam, a fuel ejecting pump including a casing and a plunger having limited movement relative to the casing, means operated ELIZABETH F. GARDNER,
*urvivor of Community Estate of
    Charles W. Gardner, Deceased.*
nesses:
IKE D. WHITE,
ELLA V. EVERITT.

for bodily moving the pump relative to the operating means thereby to move the plunger into or out of contact with the tappet to vary the stroke of the plunger by the tappet.

8. Fuel controlling means for internal combustion engines including a pump cas-